Sept. 20, 1932.  A. C. NOWLIN  1,878,423
NUT CRACKING MACHINE
Filed June 25, 1930  3 Sheets-Sheet 1
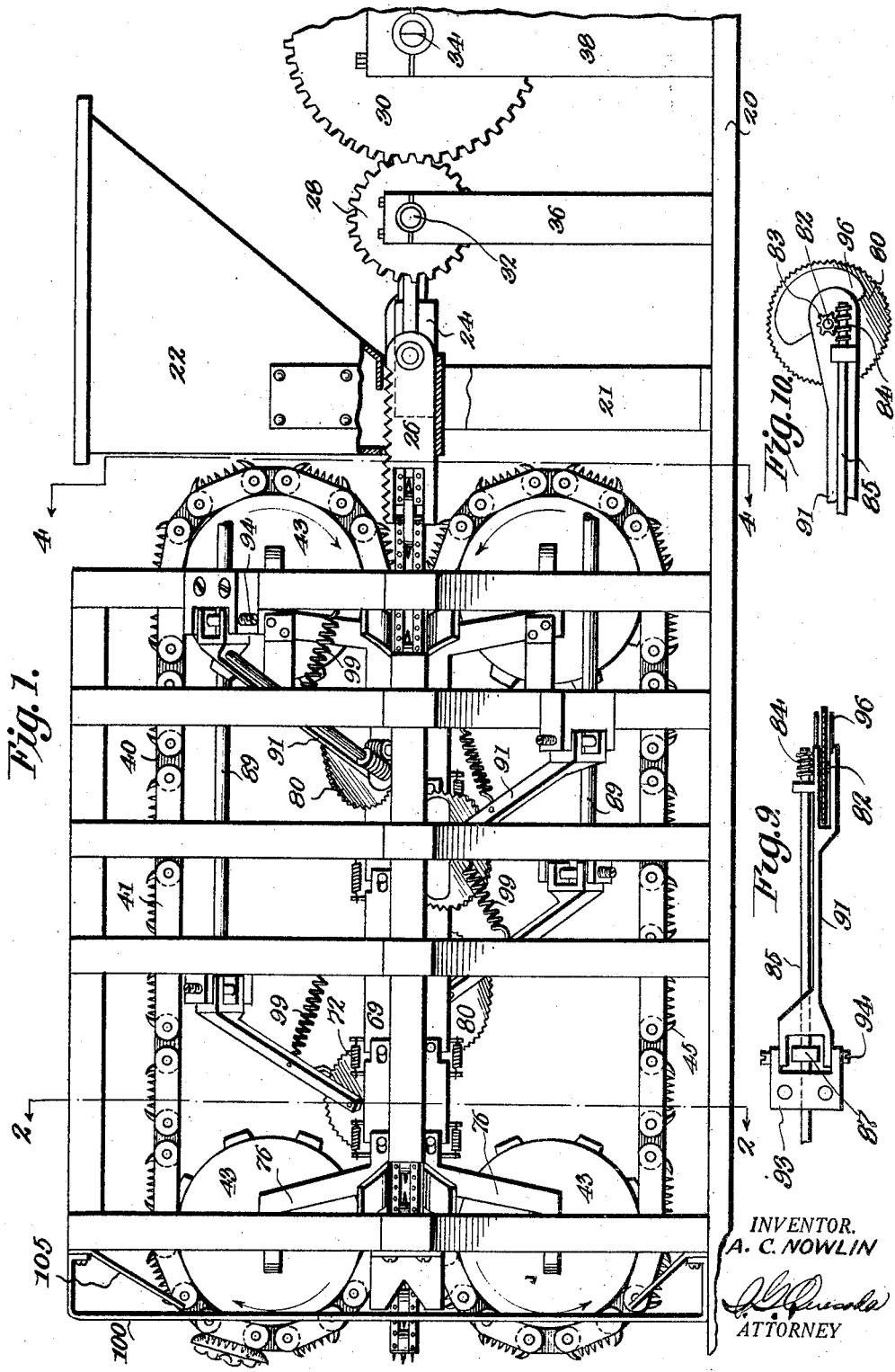
INVENTOR.
A. C. NOWLIN
ATTORNEY Sept. 20, 1932.  A. C. NOWLIN  1,878,423
NUT CRACKING MACHINE
Filed June 25, 1930   3 Sheets-Sheet 2
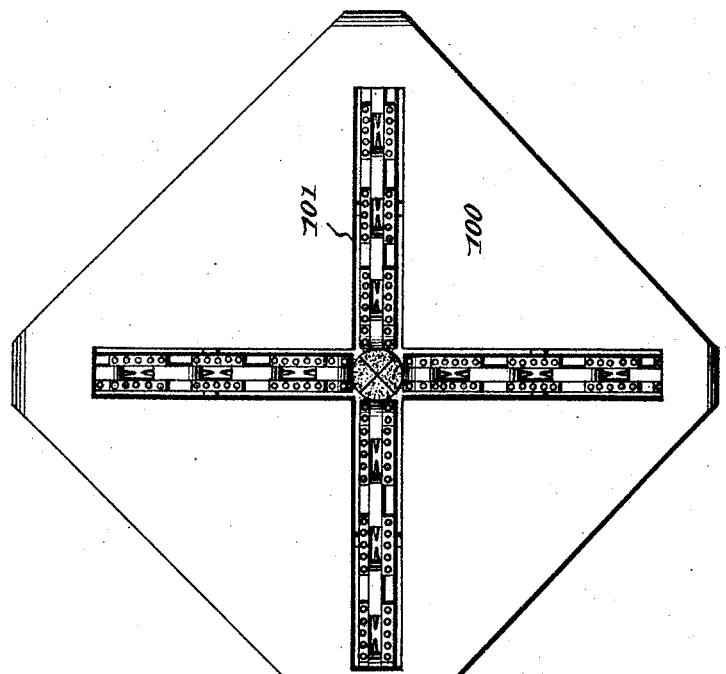
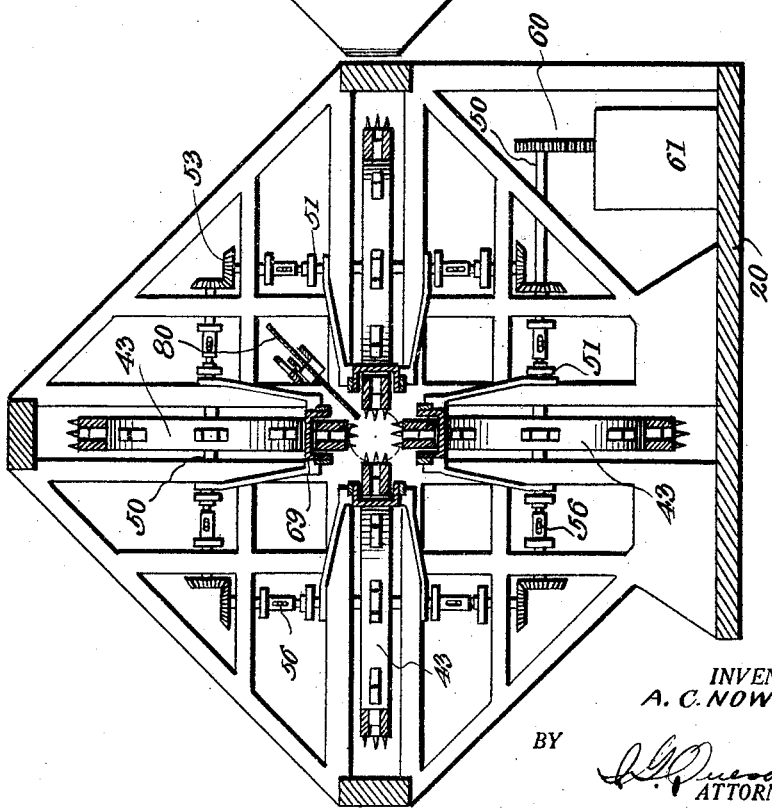
INVENTOR.
A. C. NOWLIN
BY
ATTORNEY Sept. 20, 1932. A. C. NOWLIN 1,878,423
NUT CRACKING MACHINE
Filed June 25, 1930 3 Sheets-Sheet 3
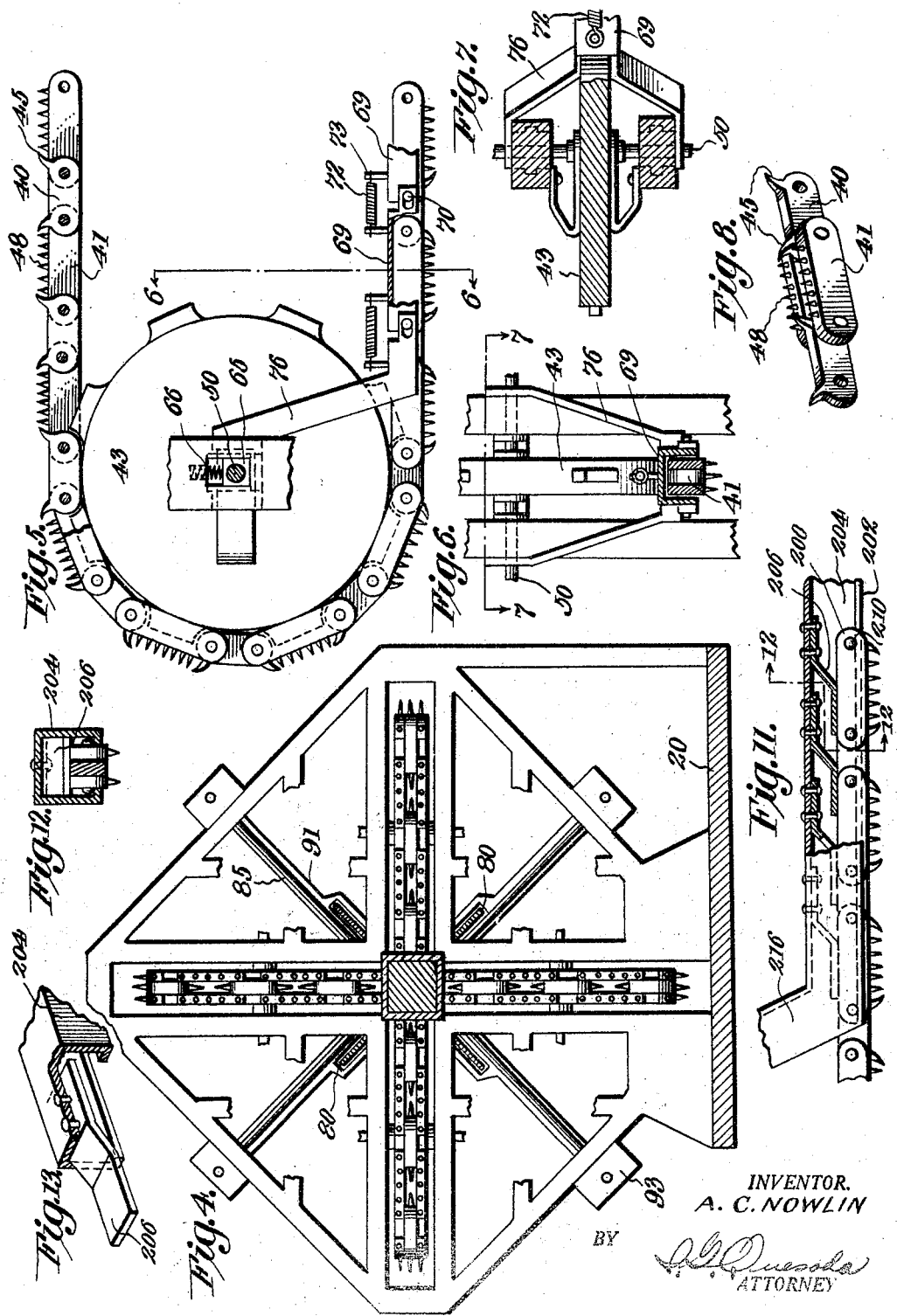
INVENTOR.
A. C. NOWLIN
BY
ATTORNEY Patented Sept. 20, 1932

1,878,423

UNITED STATES PATENT OFFICE

AUBREY C. NOWLIN, OF BEGGS, OKLAHOMA, ASSIGNOR OF THREE-TENTHS TO A. C. FLIEG, OF HENRYETTA, OKLAHOMA, AND ONE-TENTH TO J. G. SALES, OF OKMULGEE, OKLAHOMA

NUT CRACKING MACHINE

Application filed June 25, 1930. Serial No. 463,721.

This invention relates to nut opening and picking machines and the application will be found to be a continuation in part of my co-pending application Serial No. 332,827, filed January 16, 1929.

Briefly stated, an important object of this invention is to provide a machine having means to hold the shells of pecans or the like in position to be cut into sections or segments, after which the segments are separated to expose the kernels for removal.

More specifically, the invention contemplates a novel form of nut conducting means in the nature of a plurality of chains having prongs adapted to be automatically imbedded in the shells of the pecans to hold the same securely in position during the successive cutting operations to which the nuts are subjected during the travel thereof through the machine, the arrangement and mounting of the pronged chains being such that when the nuts reach the outlet end of the machine, the previously formed segments of the nut shells are directed into diverging paths to separate the same and thereby expose the kernels of the nuts for recovery.

Another attribute of the invention resides in the particular means by which the nut conducting and cutting means are automatically adapted to nuts of various sizes within commercial limits so that no previous sorting or grading of the nuts is necessary.

Other objects and advantages will be apparent during the course of the following description.

In the accompanying drawings forming a part of this application and in which like numerals are employed to designate like parts throughout the same, Figure 1 is a fragmentary side elevation of the improved machine, Figure 2 is a vertical transverse sectional view taken on line 2—2 of Figure 1, Figure 3 is an end view illustrating a stripper plate by which the kernels of the nut are removed intact from the sections to which the same may remain subsequent to the separation of the shells into sections.

Figure 4 is a vertical transverse sectional view taken on line 4—4 of Figure 1,

Figure 5 is a detail longitudinal sectional view illustrating one of the nut conducting chains and the guiding means therefor, Figure 6 is a detail transverse sectional view taken on line 6—6 of Figure 5, Figure 7 is a detail transverse sectional view taken on line 7—7 of Figure 6, Figure 8 is a perspective of a portion of one of the chains embodied in the invention, Figure 9 is an edge elevation of a saw embodied in the invention, Figure 10 is a fragmentary side elevation of the saw, Figure 11 is a detail longitudinal sectional view illustrating a modified form of conveyor, Figure 12 is a detail transverse sectional view taken on line 12—12 of Figure 11, Figure 13 is a fragmentary sectional perspective of the modified form of conveyor.

In the drawings wherein for the purpose of illustration is shown a preferred embodiment of the invention, the numeral 20 designates a base constituting a support for the machine. Figure 1 illustrates that a standard 21 is mounted on the base and has a hopper 22 mounted thereon. The discharge opening in the bottom of the hopper is intersected by ejecting and straightening elements 24 and 26, respectively, forming no special part of this invention and fully disclosed in the herein identified co-pending application. The ejecting and straightening elements 24 and 26, respectively, have connection with a spur gear 28 driven by a second spur gear 30, the spur gears 28 and 30 being mounted on shafts 32 and 34, respectively. The shafts 32 and 34 are mounted on standards 36 and 38, respectively.

The ejecting element 24 constitutes a means by which the pecans are furnished singly to the conveyors by which the pecans are conducted through the machine for longitudinal cutting by the saws to be described. In this connection, attention is invited to Figure 2 in which it is illustrated that there are four separate jointly operated conveyor chains approximately ninety degrees apart and having active runs extending in spaced parallel relation so that the teeth and prongs carried thereby may have effective engagement with the pecans to hold the same in position to be cut lengthwise by the saws.

Each conveyor embodies a link chain which, as shown in Figure 8, comprises a plurality of longitudinally spaced individual links 40, the ends of which have pivotal connection with pairs of laterally spaced links 41. Each chain is, of course, endless and is trained about a pair of sprocket wheels 43. More specifically, the pairs of links 41 of each chain extend on opposite sides of the teeth of the sprocket wheels, while the individual links 40 extend between the teeth of the sprocket wheels.

Figure 1 illustrates that the pecans are furnished to the machine at what might be said to be the point of convergence of the various conveyor chains so that as the chains do converge, the angularly or obliquely extending prongs 45 at the ends of the individual links 40 will be brought into pressure engagement with the incoming pecans to hold the same firmly in place for the subsequent cutting operation. More specifically, as the various links of the chains move inward at the inlet end of the machine to form the active runs of the conveyors the prongs at opposite ends of a particular pair of laterally spaced links 41 are moved inward toward the adjacent pecan and are embedded therein.

Also, the edges of the laterally spaced links 41 are shown to be provided with rows of fixed teeth 48 which cooperate with the prongs 45 in securing the pecans in firm position for the subsequent cutting operation.

Before proceeding with the description of the specific means by which the pecans are cut into quartered sections or segments, reference might be had to the fact that the machine is adaptable for use in connection with pecans of various sizes without previous grading of the pecans and without special adjustment of the machine.

Figure 2 illustrates that the sprocket wheels 43 are mounted on shafts 50 in which universal joints 51 of any type are interposed. The universal joints 51 are located at opposite sides of the sprocket wheels 43 to permit of the radial separation of the sprocket wheels and the chains carried thereby without disturbing the driving engagement between the bevelled gears 53 on the outer portions of the shafts. Slip joints 56 in the shafts 50 provide for the variations in the lengths of the shafts 50, which variations, of course, occurs as a result of the radial separation or movement of the various sprocket wheels. This construction permits of the radial movement of the various sprocket wheels and chains carried thereby to accommodate pecans of various sizes.

Figure 2 illustrates that one of the shafts 50 is provided at one end thereof with a spur gear 60 or other motion transmitting means for connection with a source of power 61 of any nature. It is believed to be apparent that the source of power may be built into the machine, attached thereto or that the source of power may be taken from a remote point, it being obvious that any suitable means may be employed to operate the machine to bring about the movement of the active runs of the conveyors continuously in the same direction.

In Figure 5 it is illustrated that each shaft 50 is carried by bearing blocks 65 slidably carried by the frame of the machine and urged inward by expansion springs 66. More specifically, the bearing blocks 65 through which the shafts 50 extend are slidable in the openings in the frame and are urged inward by the associated springs 66 so that the active runs of the conveyors will be urged constantly into pressure engagement with the pecans.

With reference to the foregoing description, it is believed to be apparent that the admission of pecans to the machine is allowed without the necessity of previous grading of the pecans. Of course, pecans do not vary widely in size and the tolerance allowed by the yieldable mounting of the various conveyors assures accommodation of pecans within all commercial limits.

The active or inner runs of the four conveyor chains are braced by separate channel members which, as suggested in Figure 5, embody pivotally and slidably connected links 69. The ends of the links are overlapped and are connected for sliding and pivotal movement by pivot pins 70. More specifically, the pivot pins 70 are extended through the overlapped sides of the channeled links 69 and the pivot elements operate in slots to allow of limited longitudinal separation of the various links 69 incident to the outward movement of the same.

The sections or links 69 are held in line with each other and are urged inward in the direction of the pecans by springs 72, the ends of which are attached to lugs 73 carried by the end portions of the links or sections 69.

Figure 5 also illustrates that the ends of the guides defined by the members 69 and associated elements have connection with arms 76, the outer portions of which are connected in any suitable manner to the bearing blocks 65 or to the shafts 50. Thus it is, that the chain guides defined by the elements 69 and associated parts are mounted for radial movement in unison with the active runs of the conveyor. That is to say, when the active runs of the conveyor are caused to yield as a result of the entrance into the machine of an unusually large pecan the guides defined by the elements 69 and associated parts are allowed to yield also. As soon as the necessity for yielding on the part of the chains has passed, the springs 72 are allowed to assert themselves and return the channeled sections 69 to their normal positions as shown in Figure 5.

As previously stated, the pecans are fed to the converging inlet ends of the active runs of the conveyors so that the prongs 45 of adjacent links will be embedded into the shells of the pecans to cooperate with the teeth 48 in holding the pecans firmly in place for the subsequent cutting operation.

Coming now to the means by which the pecans are subjected successively to the cutting action of a plurality of saws, attention is invited to Figures 1 and 2, in which it is illustrated that a plurality of disk saws 80 are located about ninety degrees apart and are located one in advance of the other or are staggered at spaced points in the line of travel of the pecans so that the various longitudinal cuts of the pecan shell are made successively as distinguished from the possibility that these cuts might be made simultaneously. The general arrangement of the saw is illustrated in Figures 1 and 2, while the specific construction of the saws is shown in Figures 9 and 10, the latter figures illustrating that the saws are mounted on spindles or shafts 82 having worm gears 83 engaged by worms 84 on the forward portions of motion transmitting shafts 85.

The outer portions of the shafts 85 are provided with suitable motion transmitting means 87 for operative connection with longitudinal shafts 89 extending from a convenient source of power. The shafts 85 and the spindles 82 are carried by arms 91 having the outer portions thereof bifurcated to straddle the motion transmitting means 87 and at the same time to define ears that are swivelly connected to brackets 93 by fastening devices 94. By this arrangement, the saws are rotated for cutting through the shells of the pecans and, as clearly shown in Figures 2 and 10, the cutting depths of the various saws are limited by more or less semicircular guards 96.

The guards 96 are located on opposite sides of the disks 80 and engage the nut shells to confine the cuts to the shells and leave the kernels intact for subsequent recovery. Attention is invited to the fact that the ends of the guards recede appreciably to bring about relatively deep cuts at the ends of the pecan shells. By this arrangement, the complete division of the pecan shell into four sections is assured.

It might be noted that the shells of pecans are known to be substantially thicker at the ends than at the intermediate portions thereof. Thus, the relatively deep cuts at the ends of the pecans bring about what might be said to be the complete shattering or disintegration of the ends of the pecans so that the removal of the kernels is greatly simplified.

The saws are urged into pressure contact with the pecan shells by springs 99.

When the quartered pecan shells and the enclosed kernels reach the outlet end of the machine, the various sections of the shell will remain temporarily connected to the sprocket chains and will thus expose the kernels of the pecans.

It may be that the kernel of a pecan will drop away from all of the sections of its shells, but in case it does not, it will be conveyed into engagement with a stripper plate 100 and thus will be freed to drop into a suitable receiver located below. The stripper plate 100 is shown in Figure 3 to be provided with intersecting slots 101 receiving portions of the sprocket wheels and the sprocket chains and closely embracing these parts for engagement with the kernels of the pecans.

The quartered sections of the pecan shells will remain attached to the prongs and teeth of the various links of the chains until engaged with the stripper arms 105 carried by the frame of the machine. Figure 1 illustrates that the stripper arms 105 are provided with V-shaped notches, the walls of which are adapted for engagement with the shells of the pecans to completely detach the same from the prongs 45 and teeth 48.

In describing the operation of the invention, attention might be directed to Figure 1 in which it is illustrated that the pecans furnished to the hopper 22 are directed singly into the space between the active runs of the conveyors by the ejecting and straightening devices 24 and 26, respectively. In passing, it might be noted that the ejecting and straightening devices in addition to constituting a feeding means for the various pecans provide for the agitation of the pecans located within the hopper 22 so that the orderly supply of pecans is assured.

When the pecans are thus fed singly to the inlet end of the machine, the links 40 will, in riding about the sprocket wheels 43, come into engagement with the nuts and will thereby secure the same in position for the subsequent cutting operation. The laterally spaced rows of teeth 48 will also have secure engagement with the shells of the pecans. It is important to observe that the active runs of the conveyors have the edges thereof slightly spaced from each other to allow the saws to come into cutting engagement with the shells.

As the pecans progress through the machine, the same are subjected successively to the cutting action of the rapidly rotating disk saws 80 and, as previously suggested, the cuts of the ends of the pecans are made deeper than the cuts in the intermediate portions of the shells so that the complete disintegration of the ends of the shells is assured without, at the same time, making objectionably deep cuts in the intermediate portions of the shells, all with the result that the meat of the pecans is held intact for subsequent recovery.

Of course, as the various links of the conveyors separate or diverge at the outlet end of the machine, the previously formed sections of the pecans will remain attached to the links with which the same were formerly associated, thereby exposing the kernels of the pecans. The kernels may remain attached to one of the sections or the same may drop into a suitable receiver below. The angularly disposed stripper arms 105 attached to the ends of the machine constitute a simple means by which the shells or sections thereof are finally removed from the chains to present clean teeth to the incoming pecans.

In the modification illustrated in Figures 11, 12 and 13, each conveyor chain 200 rides between the inwardly flanged lower terminal portions 202 of a channel shaped guide 204. Figures 11 and 13 clearly illustrate that the links of each chain 200 are separately urged into pressure engagement with the pecans by leaf springs 206, the outer portions of which are riveted or otherwise secured to the bight portion of the channel shaped member 204. The intermediate portions of the leaf springs 206 are offset to locate the inner portions of the leaf springs for contact with the outer edges of the links. In this manner, the individual springs urge the chains into pressure engagement with the pecans and at the same time allow of radial movement of the chains for the accommodation of pecans of various sizes. The leaf springs 206 are shown to be located in overlapping relation so that the chain engaging portions are located sufficiently close together to provide for effective engagement of the various chains with the pecans.

The connecting pivot elements 210 joining the various links of the chains are extended beyond the sides of the links and ride on the inwardly flanged portions 202 to limit inward movement of the chains or in other words to hold the chains normally in line and at the same time to allow of radial separation of the chains in response to the entrance into the machine of pecans of varying sizes.

The ends of the channel member 204 are extended angularly to form arms 216 that are attached to the supports for the various sprocket wheels.

In carrying out the invention, it is possible to provide pivotally mounted dogs similar to the dogs 40 in the herein identified application, which dogs are urged into pressure engagement with the pecans by the individual leaf springs 206.

Having thus described the invention, what is claimed is:

1. In a machine for deshelling nuts, a plurality of radially arranged endless conveyors having active runs in substantially parallel relation about a common center to define a nut passage having inlet and outlet ends, said conveyors being provided with teeth for penetrating engagement with the shells, yieldable guiding devices for the active runs of the conveyors, and a common yieldable supporting means for the conveyors and said guiding devices.

2. In a machine for opening and picking pecans, a plurality of conveyor chains having active runs located about a common center to define inlet and outlet ends, guides associated with the conveyor chains and having individual spring members for urging the chains into pressure engagement with the pecans, said guides being of U-shaped formation and having channels receiving said chains.

3. In a machine for opening and picking pecans, a plurality of conveyors having active runs in substantially parallel relation about a common center, guides having channels partly receiving said active runs, said conveyors being provided with pivoted dogs for engagement with pecans, springs carried by said guides and engaging said dogs to urge the same into pressure engagement with pecans, and supporting means for said guides.

4. In a machine for opening and picking nuts, a plurality of conveyors having active runs located about a common center to define inlet and outlet ends, and guides associated with the active runs of said conveyors and having individual leaf springs engaging the active runs of the conveyors to urge the same into engagement with the nuts, there being means limiting the inward movement of said active runs under the influence of said springs.

In testimony whereof I affix my signature.

AUBREY C. NOWLIN.